(12) United States Patent
Deng et al.

(10) Patent No.: US 12,505,294 B1
(45) Date of Patent: Dec. 23, 2025

(54) METHODS, SYSTEMS, AND COMPUTER PROGRAM PRODUCTS FOR DETERMINING WHETHER TO REVIEW MEDICAL RECORDS FOR MEDICAL CODING

(71) Applicant: Optum, Inc., Minnetonka, MN (US)

(72) Inventors: Chenda Deng, Fort Collins, CO (US); Bo Han, Bothell, WA (US); Lynne Miller Padilla, Oceanside, CA (US); Saloni Parikh, Seattle, WA (US); Lei Qi, Seattle, WA (US); Feili Yu, Shoreline, WA (US); Wayne Zhang, Fremont, CA (US)

(73) Assignee: Optum, Inc., Minnetonka, MN (US)

( * ) Notice: Subject to any disclaimer, the term of this patent is extended or adjusted under 35 U.S.C. 154(b) by 233 days.

(21) Appl. No.: 18/190,229

(22) Filed: Mar. 27, 2023

(51) Int. Cl.
*G06F 40/284* (2020.01)
*G16H 10/60* (2018.01)
*G16H 15/00* (2018.01)

(52) U.S. Cl.
CPC ........... *G06F 40/284* (2020.01); *G16H 10/60* (2018.01); *G16H 15/00* (2018.01)

(58) Field of Classification Search
CPC ....... G06F 40/284; G16H 10/60; G16H 15/00
See application file for complete search history.

(56) References Cited

U.S. PATENT DOCUMENTS

2024/0078390 A1\* 3/2024 McNair .................... G06F 40/30
2024/0386738 A1\* 11/2024 Luo .......................... G06N 3/04

\* cited by examiner

*Primary Examiner* — Pierre Louis Desir
*Assistant Examiner* — Daniel W Chung
(74) *Attorney, Agent, or Firm* — MARSHALL, GERSTEIN & BORUN LLP

(57) ABSTRACT

A method includes receiving a record containing clinical information associated with a patient; processing the record using a first AI model that is trained based on medical term frequency throughout respective ones of a plurality of historical medical records; processing the record using a second AI model that is trained based on medical terms used in encounter portions of the respective ones of the plurality of historical medical records; generating a first recommendation for performing a coding review of the record based on processing the record using the first AI model; generating a second recommendation for performing the coding review of the record based on processing the record using the second AI model; and logically combining the first and second recommendation for performing the coding review to generate a final recommendation for performing the coding review.

11 Claims, 9 Drawing Sheets

METHODS, SYSTEMS, AND COMPUTER PROGRAM PRODUCTS FOR DETERMINING WHETHER TO REVIEW MEDICAL RECORDS FOR MEDICAL CODING

FIELD

The present inventive concepts relate generally to health care systems and services and, more particularly, to decision support systems for use in coding clinical records.

BACKGROUND

Health care service providers record clinical information associated with patients under their care in clinical charts, which are typically stored as electronic health records. A chart or health record for a patient may be lengthy sometimes exceeding a thousand pages in length. Health care providers typically assign the health records to coders that review the records and assign codes to the various procedures and diagnoses contained therein. The coders may make use of tools or support systems to assist them in assigning codes to the various portions of clinical information contained within the records. The codes are used in generating claims for the services provided by the health care providers for submission to payors for reimbursement. When reviewing claims for payment, payors may also obtain patient medical records and may review the records to identify the evidence within the records and codes associated therewith to support the various services for which the provider is seeking payment. The process of reviewing health care records to identify subject matter that can support a diagnostic code, however, may be very time consuming. Codes may need to read through thousands of pages in some circumstances where the medical record is lengthy. Oftentimes, however, a medical chart may not include any subject matter that supports a medical code. These medical records or charts may not contain a diagnosis, e.g., chronic condition, that risk adjusts. Without the ability to identify these medical records in advance, coders may needlessly spend many hours reviewing these records looking for errant or missing codes that do not exist.

SUMMARY

According to some embodiments of the inventive concept, a method comprises: receiving a record containing clinical information associated with a patient; processing the record using a first AI model that is trained based on medical term frequency throughout respective ones of a plurality of historical medical records; processing the record using a second AI model that is trained based on medical terms used in encounter portions of the respective ones of the plurality of historical medical records; generating a first recommendation for performing a coding review of the record based on processing the record using the first AI model; generating a second recommendation for performing the coding review of the record based on processing the record using the second AI model; and logically combining the first and second recommendation for performing the coding review to generate a final recommendation for performing the coding review.

In other embodiments, the method further comprises communicating the final recommendation to a coding entity.

In still other embodiments, processing the record using the first AI model comprises: processing each of the pages of the record using Natural Language Processing (NLP); and determining a frequency of one or more medical terms used throughout the record.

In still other embodiments, processing the record using the second AI model comprises: partitioning the clinical information in the patient record based on encounter; identifying, for each encounter, one or more sections of the clinical information in the record corresponding to a diagnosis that risk adjusts; and identifying, for each encounter, any medical terms contained in the one or more sections of the clinical information in the record using NLP.

In still other embodiments, the method further comprises: determining, using the first AI model, a first probability that one or more codes may be associated with the clinical information in the record based on the frequency of the one or more medical terms used throughout the record; and determining, using the second AI model, a second probability that one or more codes may be associated with the clinical information in the record based on whether any medical terms are contained in the one or more sections of the clinical information in the record.

In still other embodiments, the method further comprises: generating the first recommendation for performing the coding review based on the first probability; and generating the second recommendation for performing the coding review based on the second probability.

In still other embodiments, logically combining the first and second recommendation to generate the final recommendation for performing the coding review comprises: generating the final recommendation for performing the coding review of the record as a recommendation not to perform the coding review of the record when the first recommendation is a recommendation not to perform the coding review and the second recommendation is a recommendation not to perform the coding review.

In still other embodiments, the one or more codes comprise International Classification of Diseases (ICD) codes, Current Procedural Terminology (CPT) codes, or both ICD codes and CPT codes.

In some embodiments, a system comprises a processor; and a memory coupled to the processor and comprising computer readable program code embodied in the memory that is executable by the processor to perform operations comprising: receiving a record containing clinical information associated with a patient; processing the record using a first AI model that is trained based on medical term frequency throughout respective ones of a plurality of historical medical records; processing the record using a second AI model that is trained based on medical terms used in encounter portions of the respective ones of the plurality of historical medical records; generating a first recommendation for performing a coding review of the record based on processing the record using the first AI model; generating a second recommendation for performing the coding review of the record based on processing the record using the second AI model; and logically combining the first and second recommendation for performing the coding review to generate a final recommendation for performing the coding review.

In further embodiments, processing the record using the first AI model comprises: processing each of the pages of the record using Natural Language Processing (NLP); and determining a frequency of one or more medical terms used throughout the record.

In still further embodiments, processing the record using the second AI model comprises: partitioning the clinical information in the patient record based on encounter; identifying, for each encounter, one or more sections of the clinical information in the record corresponding to a diagnosis that risk adjusts; and identifying, for each encounter, any medical terms contained in the one or more sections of the clinical information in the record using NLP.

In still further embodiments, the operations further comprise: determining, using the first AI model, a first probability that one or more codes may be associated with the clinical information in the record based on the frequency of the one or more medical terms used throughout the record; and determining, using the second AI model, a second probability that one or more codes may be associated with the clinical information in the record based on whether any medical terms are contained in the one or more sections of the clinical information in the record.

In still further embodiments, the operations further comprise: generating the first recommendation for performing the coding review based on the first probability; and generating the second recommendation for performing the coding review based on the second probability.

In still further embodiments, logically combining the first and second recommendation to generate the final recommendation for performing the coding review comprises: generating the final recommendation for performing the coding review of the record as a recommendation not to perform the coding review of the record when the first recommendation is a recommendation not to perform the coding review and the second recommendation is a recommendation not to perform the coding review.

In some embodiments, a computer program product, comprises: a non-transitory computer readable storage medium comprising computer readable program code embodied in the medium that is executable by a processor to perform operations comprising: receiving a record containing clinical information associated with a patient; processing the record using a first AI model that is trained based on medical term frequency throughout respective ones of a plurality of historical medical records; processing the record using a second AI model that is trained based on medical terms used in encounter portions of the respective ones of the plurality of historical medical records; generating a first recommendation for performing a coding review of the record based on processing the record using the first AI model; generating a second recommendation for performing the coding review of the record based on processing the record using the second AI model; and logically combining the first and second recommendation for performing the coding review to generate a final recommendation for performing the coding review.

In other embodiments, processing the record using the first AI model comprises: processing each of the pages of the record using Natural Language Processing (NLP); and determining a frequency of one or more medical terms used throughout the record.

In still other embodiments, processing the record using the second AI model comprises: partitioning the clinical information in the patient record based on encounter; identifying, for each encounter, one or more sections of the clinical information in the record corresponding to a diagnosis that risk adjusts; and identifying, for each encounter, any medical terms contained in the one or more sections of the clinical information in the record using NLP.

In still other embodiments, the operations further comprise: determining, using the first AI model, a first probability that one or more codes may be associated with the clinical information in the record based on the frequency of the one or more medical terms used throughout the record; and determining, using the second AI model, a second probability that one or more codes may be associated with the clinical information in the record based on whether any medical terms are contained in the one or more sections of the clinical information in the record.

In still other embodiments, the operations further comprise: generating the first recommendation for performing the coding review based on the first probability; and generating the second recommendation for performing the coding review based on the second probability.

In still other embodiments, logically combining the first and second recommendation to generate the final recommendation for performing the coding review comprises: generating the final recommendation for performing the coding review of the record as a recommendation not to perform the coding review of the record when the first recommendation is a recommendation not to perform the coding review and the second recommendation is a recommendation not to perform the coding review.

Other methods, systems, articles of manufacture, and/or computer program products according to embodiments of the inventive concept will be or become apparent to one with skill in the art upon review of the following drawings and detailed description. It is intended that all such additional systems, methods, articles of manufacture, and/or computer program products be included within this description, be within the scope of the present inventive subject matter and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
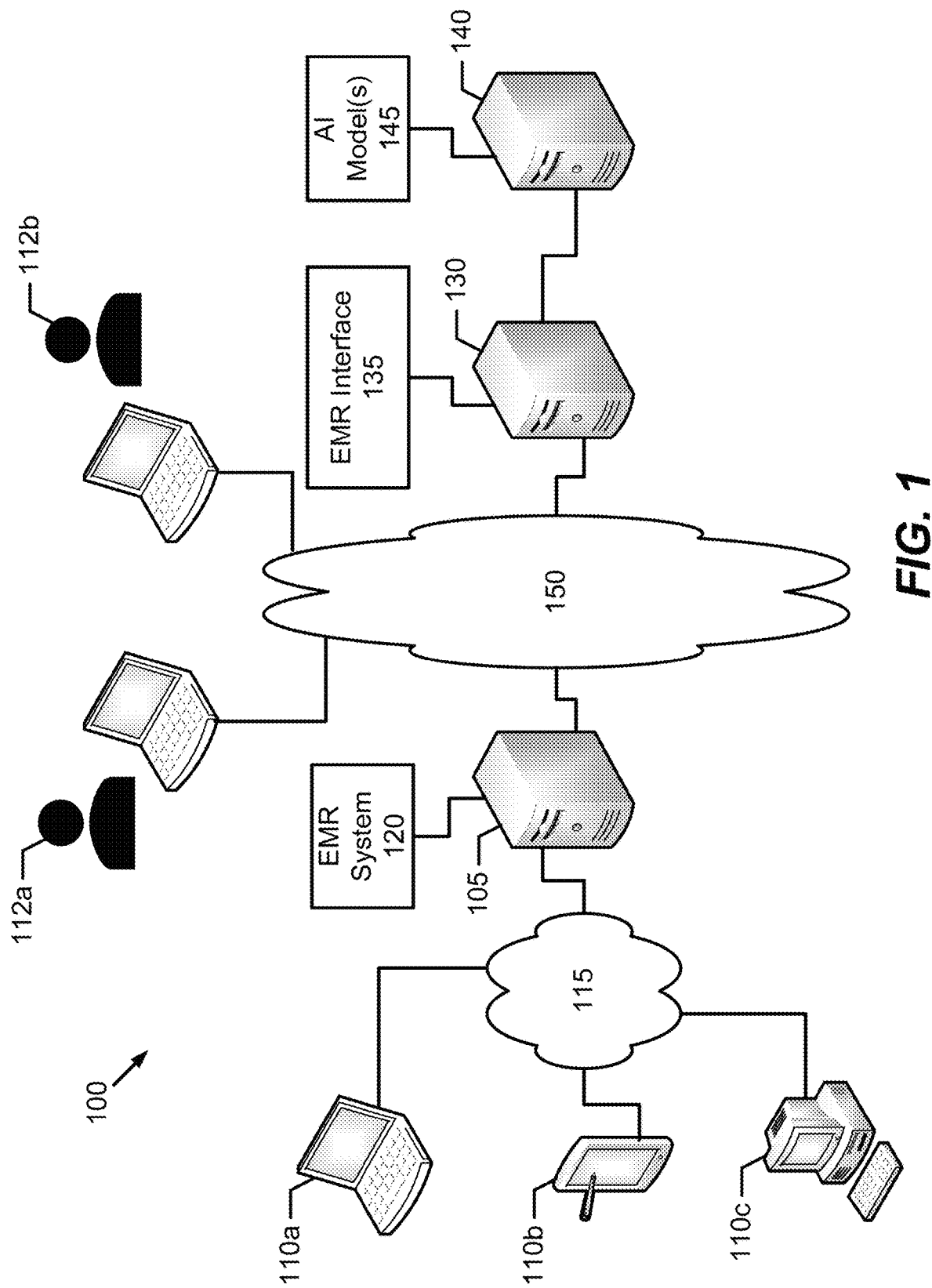
FIG. 1 is a block diagram that illustrates a communication network including an intelligent coding Decision Support System (DSS) in accordance with some embodiments of the inventive concept.

In the following detailed description, numerous specific details are set forth to provide a thorough understanding of embodiments of the inventive concept. It will be understood by those skilled in the art, however, that embodiments of the inventive concept may be practiced without these specific details. In some instances, well-known methods, procedures, components, and circuits have not been described in detail so as not to obscure the inventive concept. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term "provider" may mean any person or entity involved in providing health care products and/or services to a patient.

Embodiments of the inventive concept are described herein in the context of a Decision Support System (DSS) that includes one or more Artificial Intelligence (AI) engines for processing patient records, which include clinical information, and generating whether to perform a coding review. The embodiments of the DSS are described with respect to the use of one or more AI engines or models. It will be understood, however, that embodiments of the inventive concept are not limited to specific AI implementations of the DSS and that various types of AI systems may be used including, but not limited to, a multi-layer artificial neural network, a machine learning system, a deep learning system, a natural language processing system, and/or computer vision system. Moreover, it will be understood that the multi-layer neural network is a multi-layer artificial neural network comprising artificial neurons or nodes and does not include a biological neural network comprising real biological neurons. The AI engines or models described herein may be configured to transform a memory of a computer system to include one or more data structures, such as, but not limited to, arrays, extensible arrays, linked lists, binary trees, balanced trees, heaps, stacks, and/or queues. These data structures can be configured or modified through the AI training process to improve the efficiency of a computer system when the computer system operates in an inference mode to make an inference, prediction, classification, suggestion, or the like in response to input information or data provided thereto. These data structures can be configured or modified through the AI training process to improve the efficiency of a computer system when the computer system operates in an inference mode to make an inference, prediction, classification, suggestion, or the like with respect to making a recommendation to review a medical record or chart for coding in response to receiving the medical record or chart as input information.

Embodiments of the inventive concept are described herein with respect to the use of a DSS for processing clinical patient records and determining whether to perform a review for suggesting codes therefor. These codes may include, but are not limited to, International Classification of Diseases (ICD) codes and/or Current Procedural Terminology (CPT) codes. It will be understood that embodiments of the inventive concept are not limited to use of a DSS for processing clinical patient records and determining whether to perform a review for suggesting codes, but can be applied to classification problems in general.

Some embodiments of the inventive concept stem from a realization that performing a coding review of a medical record or chart can be expensive in terms of time, labor, and processing resources as medical records or charts can be thousands of pages long. Some embodiments of the inventive concept may provide an intelligent coding DSS that may identify whether a medical record or chart is unlikely to contain any subject matter that supports a diagnosis that risk adjusts to a particular model, such as the Affordable Care Act (ACA) model or Medicare Advantage HCC model. These identified charts are charts that do not meet a threshold of predefine criteria, such as the presence of one or more specific diagnoses, procedures, medications, and/or other chart content, and may be candidates for not performing a coding review thereon. According to some embodiments, the intelligent coding DSS incudes two AI based chart identification systems these two AI based chart identification systems are trained differently and, therefore, operate differently in prediction or inference mode. One of the chart identification systems is trained based om medical term frequency used throughout the respective pages of a medical record or chart. The other chart identification system is trained based on medical terms used in encounter portions of the medical record or chart. The recommendations on whether to perform a coding review of the medical record or chart that are output from the two different chart identification systems may be logically combined to generate a final recommendation. For example, a final recommendation not to perform a coding review of the medical record or chart may only be made when both of the recommendations output from the first and second chart identification systems is to not perform a coding review. The use of the two different AI systems that are trained differently and, therefore, operate differently in inference or prediction mode, may increase the accuracy in differentiating between records or charts for which a coding review is unnecessary and records or charts for which a coding review may be beneficial. Eliminating coding review of some records or charts may result in significant cost savings based on time, manual labor, and/or automated processing costs.

Referring to FIG. 1, a communication network 100 including an intelligent coding DSS, in accordance with some embodiments of the inventive concept, comprises a health care facility server 105 that is coupled to devices 110a, 110b, and 110c via a network 115. The health care facility may be any type of health care or medical facility, such as a hospital, doctor's office, specialty center (e.g., surgical center, orthopedic center, laboratory center etc.), or the like. The health care facility server 105 may be configured with an Electronic Medical Record (EMR) system module 120 to manage patient files and facilitate the entry of orders for patients via health care service providers ("providers"). Although shown as one combined system in FIG. 1, it will be understood that some health care facilities use separate systems for electronic medical record management and order entry management. The providers may use devices, such as devices 110a, 110b, and 110c to manage patients' electronic charts or records and to issue orders for the patients through the EMR system 120. An order may include, but is not limited to, a treatment, a procedure (e.g., surgical procedure, physical therapy procedure, radiologic/imaging procedure, etc.) a test, a prescription, and the like. The network 115 communicatively couples the devices 110a, 110b, and 110c to the health care facility server 105. The network 115 may comprise one or more local or wireless networks to communicate with the health care facility server 105 when the health care facility server 105 is located in or proximate to the health care facility. When the health care facility server 105 is in a remote location from the health care facility, such as part of a cloud computing system or at a central computing center, then the network 115 may include one or more wide area or global networks, such as the Internet.

According to some embodiments of the inventive concept, an intelligent coding DSS may be provided to assist entities, such as providers, payors, auditors, data entry personnel, and others, which are represented as users 112a and 112b in FIG. 1, in coding patient records, extracting evidence for codes from patient records, auditing existing codes and clinical information corresponding thereto, and the like. The intelligent coding DSS may include a health care facility interface server 130, which includes an EMR interface system module 135 to facilitate the transfer of information between the EMR system 120, which the providers use to manage patient charts and records and issue orders, and a coding recommendation server 140, which includes an AI model(s) module 145. The coding recommendation server 140 and AI model(s) module 145 may be configured to receive patient records from the EMR system 120 by way of the health care facility interface server 130 and EMR interface module 135. The coding recommendation server 140 and AI model(s) 145 may process each patient clinical record using two different AI models as will be described below with respect to FIGS. 2 and 3 to generate respective coding review recommendations for each of the records.

It will be understood that the division of functionality described herein between the coding recommendation server 140/AI model(s) module 145 and the health care facility interface server 130/EMR interface module 135 is an example. Various functionality and capabilities can be moved between the coding recommendation server 140/AI model(s) module 145 and the health care facility interface server 130/EMR interface module 135 in accordance with different embodiments of the inventive concept. Moreover, in some embodiments, the coding recommendation server 140/AI model(s) module 145 and the health care facility interface server 130/EMR interface module 135 may be merged as a single logical and/or physical entity.

A network 150 couples the health care facility server 105, the health care facility interface server 130, and the users 112a, 112b together. The network 150 may be a global network, such as the Internet or other publicly accessible network. Various elements of the network 150 may be interconnected by a wide area network, a local area network, an Intranet, and/or other private network, which may not be accessible by the general public. Thus, the communication network 150 may represent a combination of public and private networks or a virtual private network (VPN). The network 150 may be a wireless network, a wireline network, or may be a combination of both wireless and wireline networks.

The coding review recommendation service provided through the health care facility interface server 130, EMR interface module 135, coding recommendation server 140 and AI model(s) module 145 to automatically distinguish between medical records for which a coding review is not recommended and medical records for which a coding review may be justified may, in some embodiments, be embodied as a cloud service. For example, entities may integrate their clinical record processing system with the coding recommendation service and access the service as a Web service. In some embodiments, the code suggestion service may be implemented as a Representational State Transfer Web Service (RESTful Web service).

Although FIG. 1 illustrates an example communication network including an intelligent coding DSS for distinguishing between medical charts or records for which a coding review is not recommended and medical charts or records for which a coding review may be justified, it will be understood that embodiments of the inventive subject matter are not limited to such configurations, but are intended to encompass any configuration capable of carrying out the operations described herein.

Figure 2:
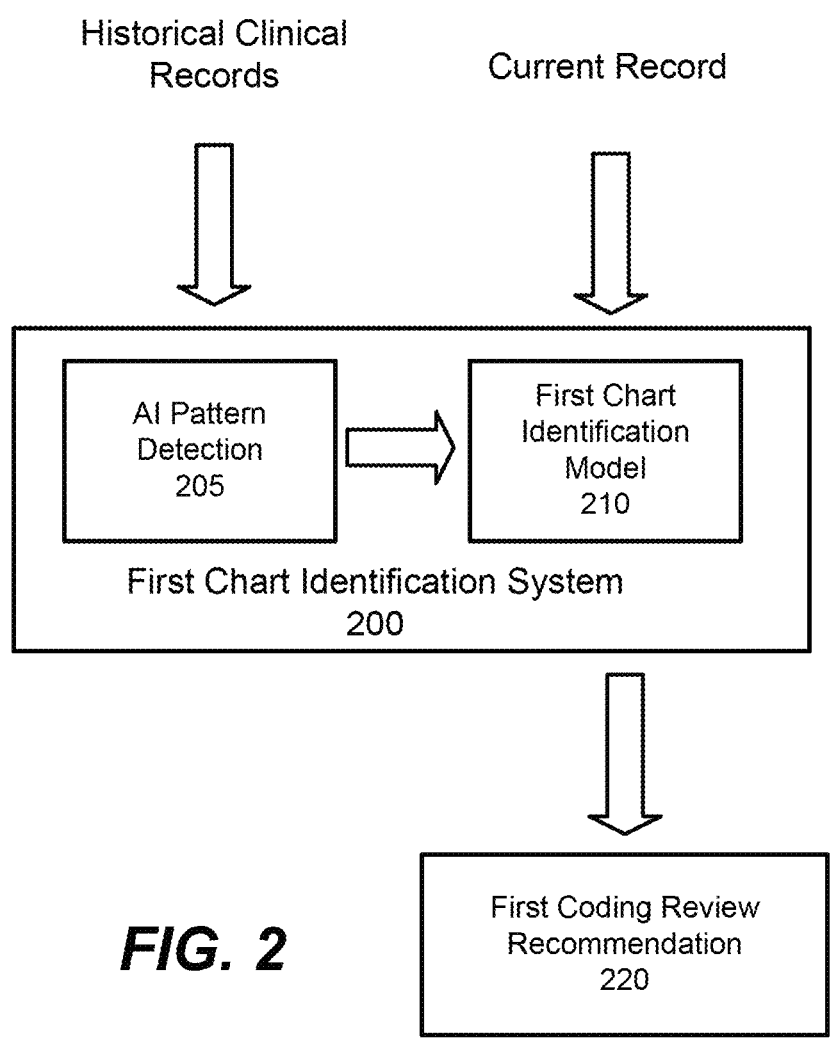
FIG. 2 is a block diagram that illustrates a first Artificial Intelligence (AI) based chart identification system in accordance with some embodiments of the inventive concept.

FIG. 2 is a block diagram that illustrates a first AI based chart identification system in accordance with some embodiments of the inventive concept. The first chart identification system 200 includes an AI pattern detection module 205 and a first chart identification model 210. The AI pattern detection module 205 may be configured to receive historical clinical health care records that may be associated with a variety of different historical patients. During training, the AI pattern detection module 205 may learn associations between features of these records with one or more diagnostic codes. In some embodiments, these associations may be based on the frequency of medical terms used throughout the pages of a medical record. The AI pattern detection module 205 may then generate the first chart identification model 210 based on these learned associations, which can be used to process a current clinical record or chart associated with a current patient. The first chart identification model 210 may generate a first coding review recommendation 220 based on whether the current record or chart is identified as a chart for which a coding review is not recommended, e.g., is unlikely to contain any subject matter that supports a diagnosis that risk adjusts to a particular model, and a chart for which a coding review may be justified.

Figure 3:
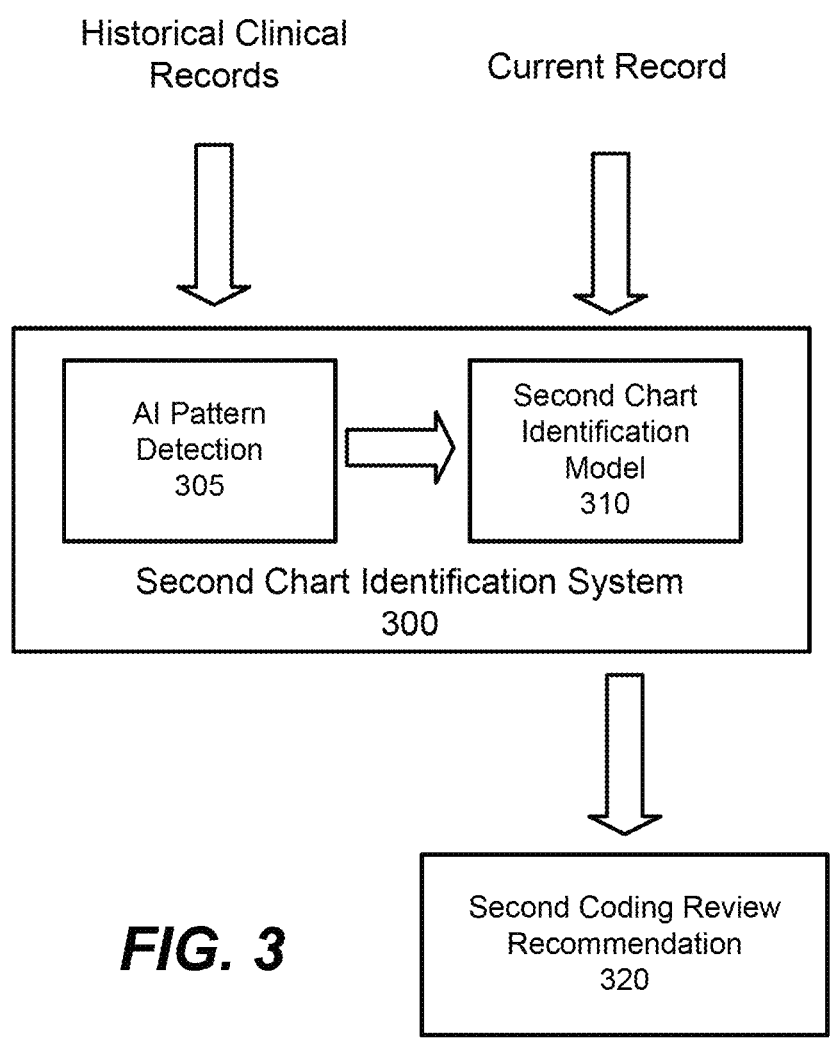
FIG. 3 is a block diagram that illustrates a second AI based chart identification system in accordance with some embodiments of the inventive concept.

FIG. 3 is a block diagram that illustrates a second AI based chart identification system in accordance with some embodiments of the inventive concept. The second chart identification system 300 includes an AI pattern detection module 305 and a second chart identification model 310. The AI pattern detection module 305 may be configured to receive historical clinical health care records that may be associated with a variety of different historical patients. During training, the AI pattern detection module 305 may learn associations between features of these records with one or more diagnostic codes. In some embodiments, these associations may be based on medical terms used in encounter portions of a medical record. The AI pattern detection module 305 may then generate the second chart identification model 310 based on these learned associations, which can be used to process a current clinical record or chart associated with a current patient. The second chart identification model 310 may generate a second coding review recommendation 320 based on whether the current record or chart is identified as a chart for which a coding review is not recommended, e.g., is unlikely to contain any subject matter that supports a diagnosis that risk adjusts to a particular model, and a chart for which a coding review may be justified.

Figure 4:
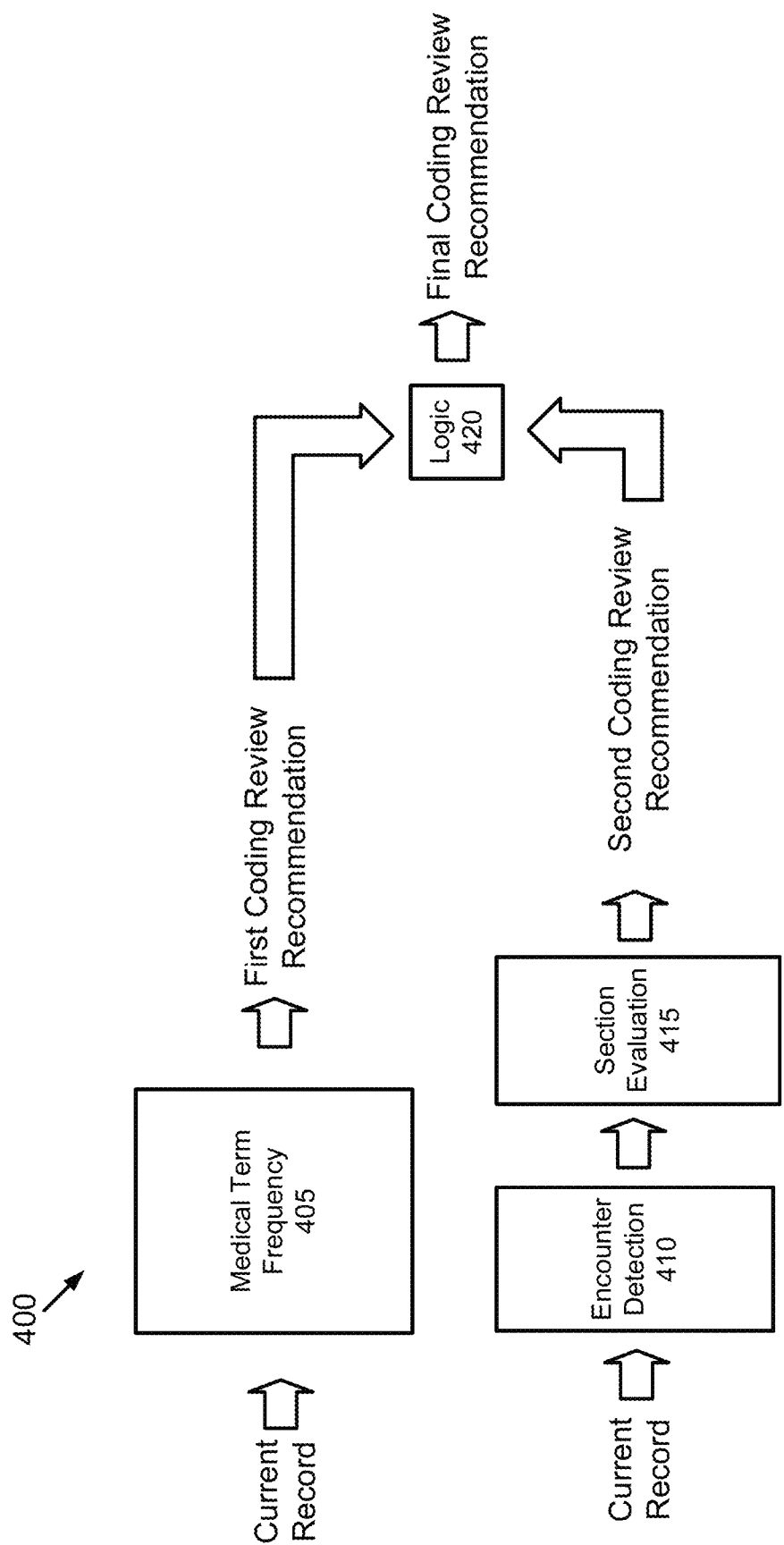
FIG. 4 is a block diagram that illustrates a coding review recommendation system in accordance with some embodiments of the inventive concept.
Figure 5:
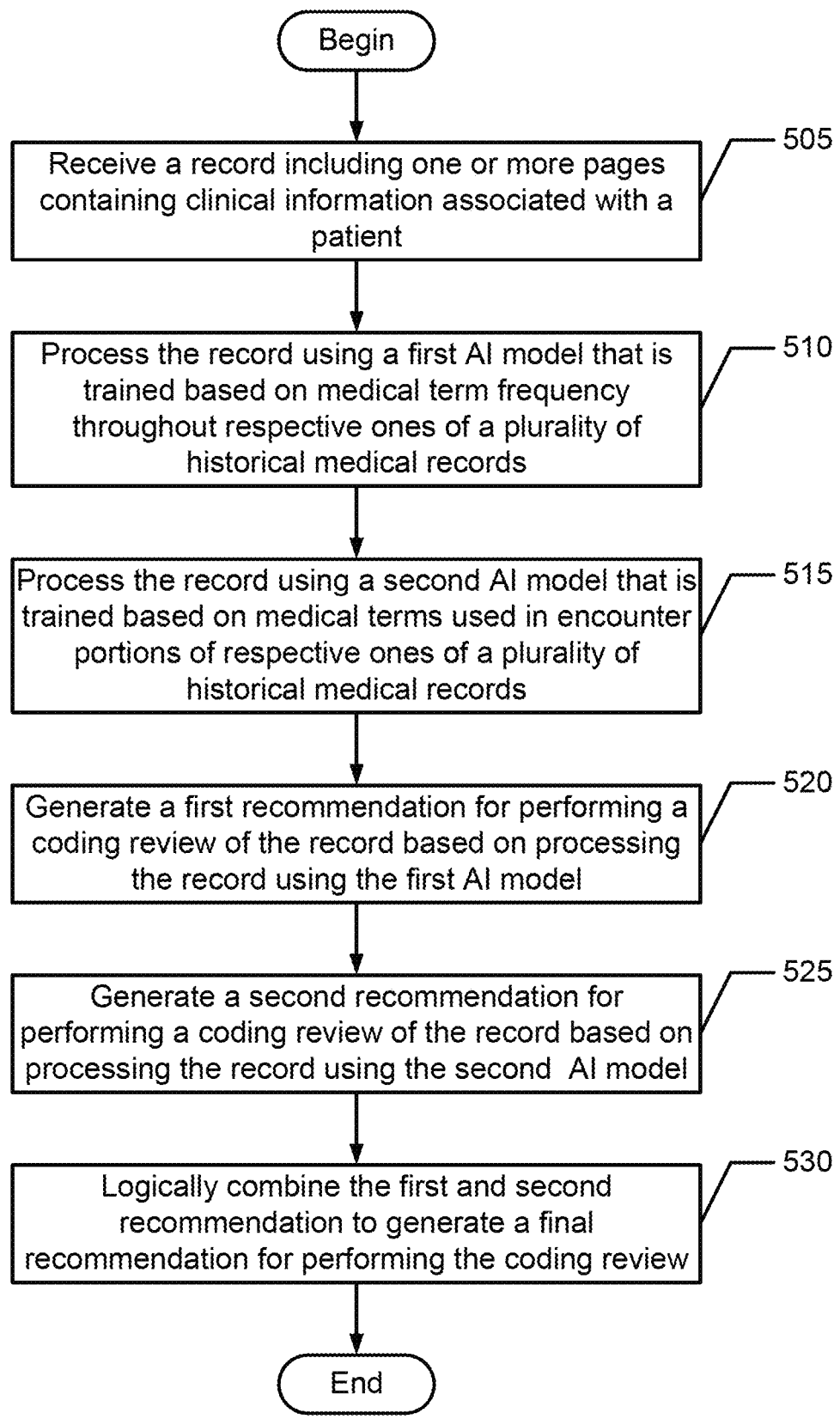
FIGS. 5-8 are flowcharts that illustrate operations of the coding review recommendation system in accordance with some embodiments of the inventive concept.

FIG. 4 is a block diagram that illustrates a coding review recommendation system 400 in accordance with some embodiments of the inventive concept. As shown in FIG. 4, when operating in inference or prediction mode, the coding review recommendation system 400 may use the first chart identification model 210 to generate the first coding review recommendation 220 based on use of a medical term frequency 405 module to determine the frequency of use of medical terms throughout the current record or chart. The first chart identification model 210 may determine that the current record is a chart for which a coding review is not recommended, a chart for which a coding review may be justified, or that the file cannot be processed due to one or more errors based on the medical term frequencies throughout the chart or record. A determination that the record is a record for which a coding review is not recommended may result in a first coding review recommendation as a recommendation not to perform a coding review of the current record or chart.

The coding review recommendation system 400 may use the second chart identification model 310 to generate the second coding review recommendation 320 based on use of an encounter detection module 410 to detect encounters within the medical chart or record and use of a section evaluation module 415 to detect instances of medical terms within the sections of the current record or chart associated with one or more encounters. Thus, the encounter detection module 410 may be configured to partition the clinical information in the patient record or chart based on encounter and the section evaluation module 415 may be configured to identify, for each encounter, one or more sections of the clinical information in the record corresponding to a diagnosis that risk adjusts. When an encounter is detected within the chart and one or more sections or portions of the clinical information associated with the encounter contains medical terms related or corresponding to subject matter that supports a diagnosis that risk adjusts to a particular model, the second chart identification model 310 may determine that the current record is a record for which a coding review may be justified. Conversely, when an encounter is detected within the chart and one or more sections or portions of the clinical information associated with the encounter does not contain any medical terms that support a diagnosis that risk adjusts to a particular model, the second chart identification model 310 may determine that the current record is one in which a coding review is not recommended. The second chart identification model 310 may determine that the current record is a record for which a coding review is not recommended in other circumstances, such as when no encounter is detected, or no section or portion of the clinical information is associated with an encounter. The second chart identification model 310 may not generate a second coding review recommendation in circumstances in which the current record or chart is too fragmented or does not have any encounters.

Both the first chart identification model 210 and the second chart identification model 310 may generate the first coding review recommendation 220 and the second coding review recommendation 320 based on the probability that one or more codes may be associated with clinical information in the record based on the frequency of one or more medical terms used throughout the record and whether any medical terms are contained in the one or more sections of the clinical information in the record that are associated with an encounter, respectively.

Figure 6:
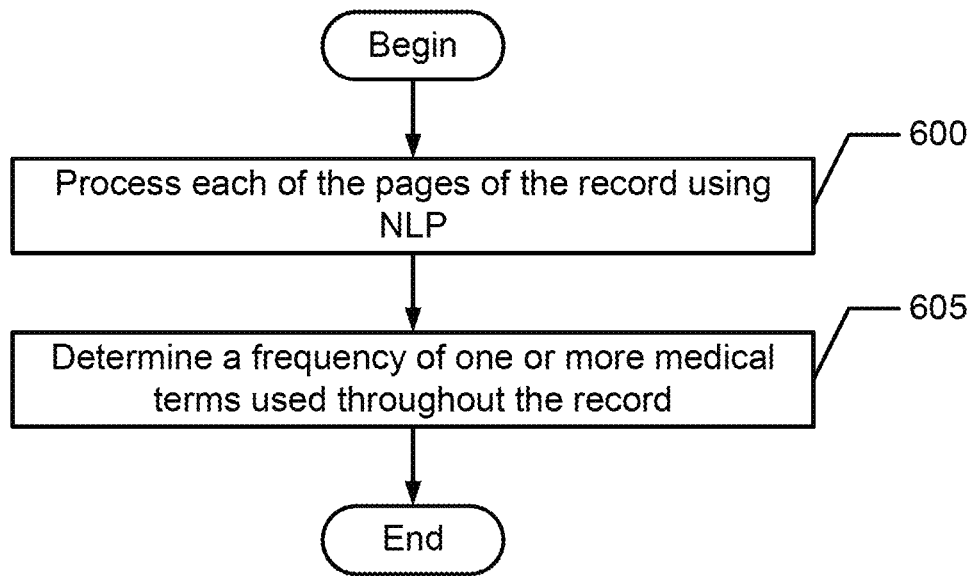

FIGS. 5-8 are flowcharts that illustrate operations of the coding review recommendation system in accordance with some embodiments of the inventive concept. Operations begin at block 505 where a record including one or more pages containing clinical information associated with a patient is received. In some embodiments, the record may be processed using optical character recognition (OCR) and processed using the first chart identification model 210 that is trained based on medical term frequency used throughout the pages of respective ones of a plurality of historical medical records. Referring to FIG. 6, in some embodiments, the first chart identification model 210 may process each of the pages of the current record using, for example, Natural Language Processing (NLP) to identify any medical terms contained therein at block 600. A frequency of use of one or more medical terms used throughout the record may be determined at block 605. Note that the frequency of use may be zero for the one or more medical terms if they are not used anyplace in the record or chart.

Figure 7:
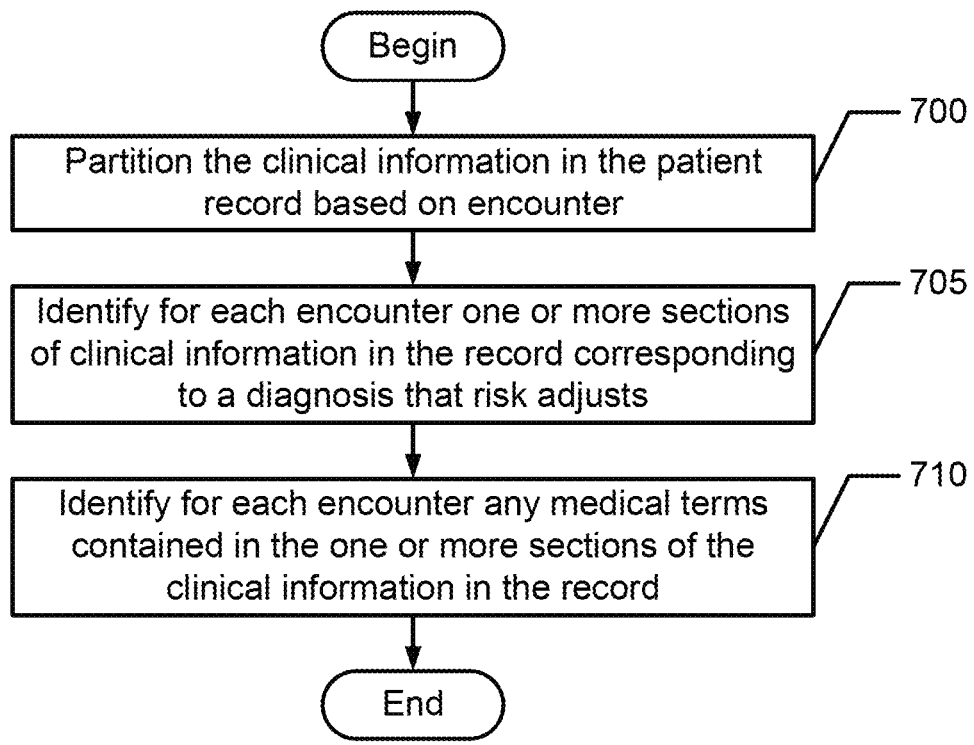

Returning to FIG. 5, operations continue at block 515 where the second chart identification model 310, which is trained based on medical terms used in sections or portions of medical records or charts that are associated with encounters, processes the record or chart. Referring to FIG. 7, in some embodiments, the second chart identification model 310 may partition the clinical information in the patient record based on encounter at block 700. For each encounter, any sections or portions of clinical information in the record that correspond to a diagnosis that risk adjusts may be identified at block 705. For each encounter containing one or sections or portions of clinical information associated therewith, any medical terms contained in these sections or portions may be identified at block 710.

Returning to FIG. 5, operations continue at block 520 where a first recommendation for performing a coding review of the record or chart is generated using the first chart identification model 210 at block 520. A second recommendation for performing a coding review of the record or chart is generated using the second chart identification model 310 at block 525. The first and second recommendations are logically combined at block 530 to generate a final recommendation for performing a coding review of the medical record or chart.

Figure 8:
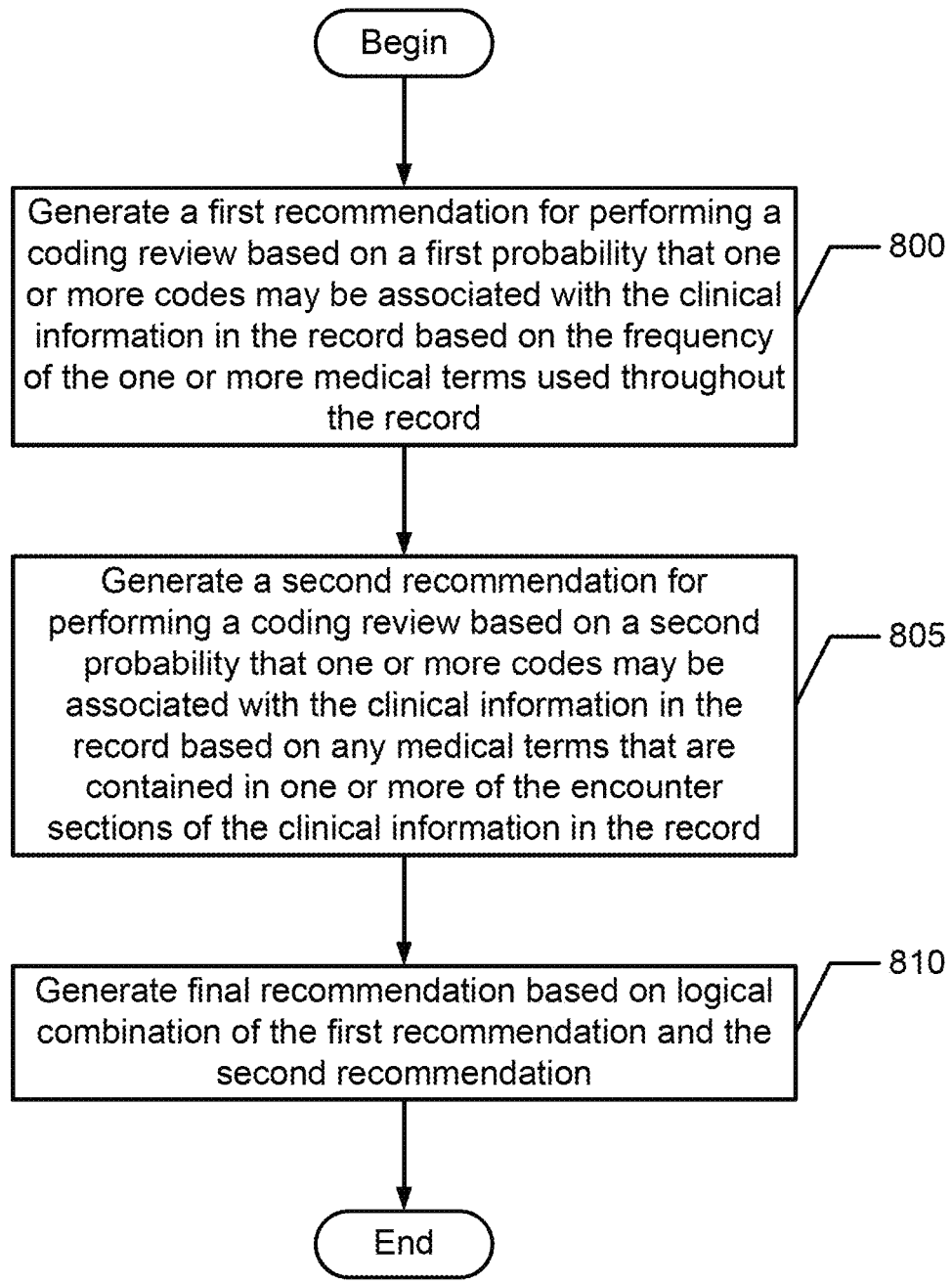

Referring to FIG. 8, at block 800 the first recommendation for performing the coding review may be based on a first probability that one or more codes may be associated with clinical information in the record or chart based on the frequency of one or more medical terms used throughout the record or chart. The second recommendation for performing the coding review may be generated at block 805 based on a second probability that one or more codes may be associated with clinical information in the record based on medical terms contained in one or more sections or portions of the clinical information associated with one or more encounters. The final recommendation may be based on the logical combination of the first recommendation and the second recommendation.

In some embodiments, the final recommendation may be generated as recommendation not to perform a coding review of the record only when the first recommendation is a recommendation not to perform a coding review of the record and the second recommendation is a recommendation not to perform a coding review of the record.

Figure 9:
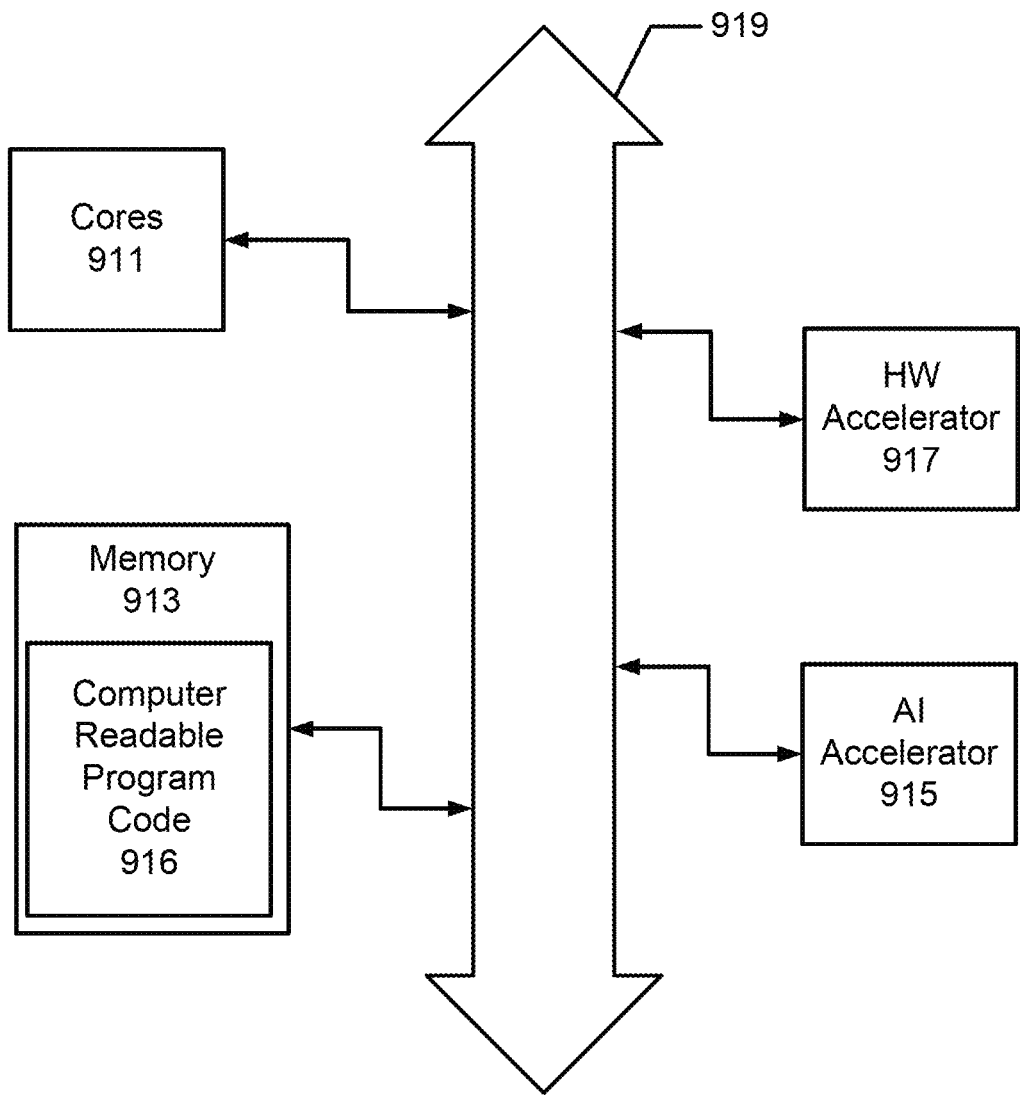
FIG. 9 is a data processing system that may be used to implement an intelligent coding DSS in accordance with some embodiments of the inventive concept.

FIG. 9 is a block diagram of a data processing system that may be used to implement the coding recommendation server 140 of FIG. 1. As shown in FIG. 9, the data processing system may include at least one core 911, a memory 913, an artificial intelligence (AI) accelerator 915, and a hardware (HW) accelerator 917. The at least one core 911, the memory 913, the AI accelerator 915, and the HW accelerator 917 may communicate with each other through a bus 919.

The at least one core 911 may be configured to execute computer program instructions. For example, the at least one core 911 may execute an operating system and/or applications represented by the computer readable program code 916 stored in the memory 913. In some embodiments, the at least one core 911 may be configured to instruct the AI accelerator 915 and/or the HW accelerator 917 to perform operations by executing the instructions and obtain results of the operations from the AI accelerator 915 and/or the HW accelerator 917. In some embodiments, the at least one core 911 may be an Application Specific Instruction Set Processor (ASIP) customized for specific purposes and support a dedicated instruction set.

The memory 913 may have an arbitrary structure configured to store data. For example, the memory 913 may include a volatile memory device, such as dynamic random-access memory (DRAM) and static RAM (SRAM), or include a non-volatile memory device, such as flash memory and resistive RAM (RRAM). The at least one core 911, the AI accelerator 915, and the HW accelerator 917 may store data in the memory 913 or read data from the memory 913 through the bus 919.

The AI accelerator 915 may refer to hardware designed for AI applications. In some embodiments, the AI accelerator 915 may include a machine learning engine configured to facilitate operations associated with a coding DSS including multiple AI based coding review recommendation systems as described above with respect to FIGS. 2-4. The AI accelerator 915 may generate output data by processing input data provided from the at least one core 915 and/or the HW accelerator 917 and provide the output data to the at least one core 911 and/or the HW accelerator 917. In some embodiments, the AI accelerator 915 may be programmable and be programmed by the at least one core 911 and/or the HW accelerator 917. The HW accelerator 917 may include hardware designed to perform specific operations at high speed. The HW accelerator 617 may be programmable and be programmed by the at least one core 911.

Figure 10:
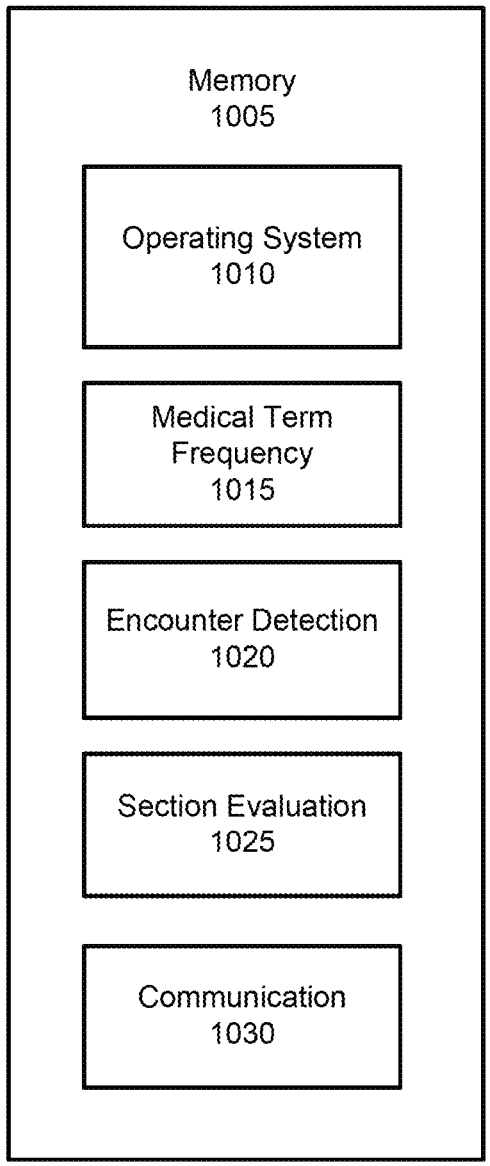
FIG. 10 is a block diagram that illustrates a software/hardware architecture for use in an intelligent coding DSS in accordance with some embodiments of the inventive concept.

FIG. 10 illustrates a memory 1005 that may be used in embodiments of data processing systems, such as the coding recommendation server 140 of FIG. 1 and the data processing system of FIG. 9, respectively, to facilitate distinguishing between a chart for which a coding review is not recommended and a chart for which a coding review may be justified and making coding review recommendations thereon. The memory 1005 is representative of the one or more memory devices containing the software and data used for facilitating operations of the coding recommendation server 140 and the AI model(s) 145 module as described herein. The memory 1005 may include, but is not limited to, the following types of devices: cache, ROM, PROM, EPROM, EEPROM, flash, SRAM, and DRAM. As shown in FIG. 10, the memory 1005 may contain five or more categories of software and/or data: an operating system 1010, a medical term frequency module 1015, an encounter detection module 1020, a section evaluation module 1025, and a communication module 1030.

In particular, the operating system 1010 may manage the data processing system's software and/or hardware resources and may coordinate execution of programs by the processor. The medical term frequency module 1015 may be configured to perform one or more of the operations described above with respect to the first chart identification system 200 of FIG. 2, the medical term frequency module 405 of FIG. 4, and the flowcharts of FIGS. 5-8. The encounter detection module 1020 may be configured to perform one or more of the operations described above with respect to the second chart identification system 300 of FIG. 3, the encounter detection module 410 of FIG. 4, and the flowcharts of FIGS. 5-8. The section evaluation module 1025 may be configured to perform one or more of the operations described above with respect to the second chart identification system 300 of FIG. 3, the section evaluation module 415 of FIG. 4, and the flowcharts of FIGS. 5-8. The communication module 1030 may be configured to facilitate communication between the coding recommendation server 140 and an entity, such as a health care provider and/or payor.

Although FIG. 10 illustrates hardware/software architectures that may be used in data processing systems, such as the coding recommendation server 140 of FIG. 1 and the data processing system of FIG. 9, respectively, in accordance with some embodiments of the inventive concept, it will be understood that embodiments of the present invention are not limited to such a configuration but is intended to encompass any configuration capable of carrying out operations described herein.

Computer program code for carrying out operations of data processing systems discussed above with respect to FIGS. 1-10 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the coding recommendation server 140 and the data processing system 900 of FIG. 9 may each be implemented as a single processor system, a multi-processor system, a multi-core processor system, or even a network of stand-alone computer systems, in accordance with various embodiments of the inventive concept. Each of these processor/computer systems may be referred to as a "processor" or "data processing system." The functionality provided by the coding recommendation server 140 may be embodied as a single server or embodied as separate servers in accordance with different embodiments of the inventive concept.

The data processing apparatus described herein with respect to FIGS. 1-9 may be used to facilitate distinguishing between a chart for which a coding review is not recommended and a chart for which a coding review may be justified and making coding review recommendations thereon according to some embodiments of the inventive concept described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 913 when coupled to a processor includes computer readable program code that, when executed by the processor, causes the processor to perform operations including one or more of the operations described herein with respect to FIGS. 1-8.

Some embodiments of the inventive concept may provide an intelligent coding DSS that includes two AI based chart identification systems that are trained differently. One of the chart identification systems is trained based om medical term frequency used throughout the respective pages of a medical record or chart. The other chart identification system is trained based on medical terms used in encounter portions of the medical record or chart. Each AI system may output a recommendation on whether to perform a coding review based on whether a chart is identified as a chart for which a coding review is not recommended and a chart for which a coding review may be justified. These outputs may be logically combined to generate a final recommendation for performing a coding review. By using two different AI systems that are trained differently and combining their respective recommendations, the overall accuracy of distinguishing between charts or records for which a coding review is not recommended and charts or records for which a coding review may be justified may be improved and records or charts may be automatically identified as not requiring coding with greater confidence, which may result in cost savings by eliminating coding reviews for records or charts for which a coding review is not recommended.

Further Definitions and Embodiments

In the above-description of various embodiments of the present inventive concept, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present inventive concept. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

In the above-description of various embodiments of the present inventive concept, aspects of the present inventive concept may be illustrated and described herein in any of a number of patentable classes or contexts including any new and useful process, machine, manufacture, or composition of matter, or any new and useful improvement thereof. Accordingly, aspects of the present inventive concept may be implemented entirely hardware, entirely software (including firmware, resident software, micro-code, etc.) or combining software and hardware implementation that may all generally be referred to herein as a "circuit," "module," "component," or "system." Furthermore, aspects of the present inventive concept may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

The description of the present inventive concept has been presented for purposes of illustration and description, but is not intended to be exhaustive or limited to the inventive concept in the form disclosed. Many modifications and variations will be apparent to those of ordinary skill in the art without departing from the scope and spirit of the inventive concept. The aspects of the inventive concept herein were chosen and described to best explain the principles of the inventive concept and the practical application, and to enable others of ordinary skill in the art to understand the inventive concept with various modifications as are suited to the particular use contemplated.

What is claimed is:

1. A method for determining with increased accuracy whether a coding review is necessary for a record, the method comprising:

receiving, by one or more processors, the record, the record containing clinical information associated with a patient;

processing, by the one or more processors, the record using a first artificial intelligence (AI) model that is trained to learn associations between features of records and diagnostic codes based on medical term frequency throughout respective ones of a plurality of historical medical records, wherein processing the record using the first AI model comprises:

processing pages of the record using natural language processing (NLP); and determining a frequency of one or more medical terms used throughout the record;

processing, by the one or more processors, the record using a second AI model that is trained to learn associations between features of records and diagnostic codes based on medical terms used in encounter portions of the respective ones of the plurality of historical medical records, wherein the first AI model and the second AI model are trained to operate differently in inference or prediction mode, and wherein processing the record using the second AI model comprises:
   partitioning the clinical information in the record based on encounter;
   identifying, for each encounter, one or more sections of the clinical information in the record corresponding to a diagnosis that risk adjusts; and
   identifying, for each encounter, medical terms contained in the one or more sections of the clinical information in the record using NLP;
generating, by the one or more processors, a first recommendation for performing the coding review of the record based on processing the record using the first AI model;
generating, by the one or more processors, a second recommendation for performing the coding review of the record based on processing the record using the second AI model; and
logically combining, by the one or more processors, the first recommendation and the second recommendation for performing the coding review to generate a final recommendation for performing the coding review, wherein logically combining the first recommendation and the second recommendation to generate the final recommendation for performing the coding review comprises:
   generating the final recommendation for performing the coding review of the record as a recommendation not to perform the coding review of the record only when the first recommendation is a recommendation not to perform the coding review and the second recommendation is a recommendation not to perform the coding review.

2. The method of claim 1, further comprising:
communicating the final recommendation to a coding entity.

3. The method of claim 1, further comprising:
determining, using the first AI model, a first probability that one or more first codes may be associated with the clinical information in the record based on the frequency of the one or more medical terms used throughout the record; and
determining, using the second AI model, a second probability that one or more second codes may be associated with the clinical information in the record based on whether any medical terms are contained in the one or more sections of the clinical information in the record.

4. The method of claim 3, further comprising:
generating the first recommendation for performing the coding review based on the first probability; and
generating the second recommendation for performing the coding review based on the second probability.

5. The method of claim 4, wherein the one or more first codes and the one or more second codes comprise International Classification of Diseases (ICD) codes, Current Procedural Terminology (CPT) codes, or both ICD codes and CPT codes.

6. A system, comprising:
one or more processors; and
at least one memory storing processor-executable instructions that, when executed by the one or more processors, cause the one or more processors to perform operations comprising:
   receiving a record containing clinical information associated with a patient;
   processing the record using a first artificial intelligence (AI) model that is trained to learn associations between features of records and diagnostic codes based on medical term frequency throughout respective ones of a plurality of historical medical records, wherein processing the record using the first AI model comprises:
      processing pages of the record using natural language processing (NLP); and
      determining a frequency of one or more medical terms used throughout the record;
   processing the record using a second AI model that is trained to learn associations between features of records and diagnostic codes based on medical terms used in encounter portions of the respective ones of the plurality of historical medical records, wherein the first AI model and the second AI model are trained to operate differently in inference or prediction mode, and wherein processing the record using the second AI model comprises:
      partitioning the clinical information in the record based on encounter;
      identifying, for each encounter, one or more sections of the clinical information in the record corresponding to a diagnosis that risk adjusts; and
      identifying, for each encounter, medical terms contained in the one or more sections of the clinical information in the record using NLP;
   generating a first recommendation for performing a coding review of the record based on processing the record using the first AI model;
   generating a second recommendation for performing the coding review of the record based on processing the record using the second AI model; and
   logically combining the first recommendation and the second recommendation for performing the coding review to generate a final recommendation for performing the coding review, wherein logically combining the first recommendation and the second recommendation to generate the final recommendation for performing the coding review comprises:
      generating the final recommendation for performing the coding review of the record as a recommendation not to perform the coding review of the record only when the first recommendation is a recommendation not to perform the coding review and the second recommendation is a recommendation not to perform the coding review.

7. The system of claim 6, wherein the operations further comprise:
determining, using the first AI model, a first probability that one or more codes may be associated with the clinical information in the record based on the frequency of the one or more medical terms used throughout the record; and
determining, using the second AI model, a second probability that one or more codes may be associated with the clinical information in the record based on whether any medical terms are contained in the one or more sections of the clinical information in the record.

8. The system of claim 7, wherein the operations further comprise:
generating the first recommendation for performing the coding review based on the first probability; and generating the second recommendation for performing the coding review based on the second probability.

9. A computer program product, comprising:

One or more non-transitory, computer-readable media storing processor-executable instructions that, when executed by one or more processors, cause the one or more processors to perform operations comprising:

receiving a record containing clinical information associated with a patient;

processing the record using a first artificial intelligence (AI) model that is trained to learn associations between features of records and diagnostic codes based on medical term frequency throughout respective ones of a plurality of historical medical records, wherein processing the record using the first AI model comprises:

processing pages of the record using natural language processing (NLP); and determining a frequency of one or more medical terms used throughout the record;

processing the record using a second AI model that is trained to learn associations between features of records and diagnostic codes based on medical terms used in encounter portions of the respective ones of the plurality of historical medical records, wherein the first AI model and the second AI model are trained to operate differently in inference or prediction mode, and wherein processing the record using the second AI model comprises:

partitioning the clinical information in the record based on encounter:

identifying, for each encounter, one or more sections of the clinical information in the record corresponding to a diagnosis that risk adjusts; and identifying, for each encounter, medical terms contained in the one or more sections of the clinical information in the record using NLP;

generating a first recommendation for performing a coding review of the record based on processing the record using the first AI model;

generating a second recommendation for performing the coding review of the record based on processing the record using the second AI model; and logically combining the first recommendation and the second recommendation for performing the coding review to generate a final recommendation for performing the coding review, wherein logically combining the first recommendation and the second recommendation to generate the final recommendation for performing the coding review comprises:

generating the final recommendation for performing the coding review of the record as a recommendation not to perform the coding review of the record only when the first recommendation is a recommendation not to perform the coding review and the second recommendation is a recommendation not to perform the coding review.

10. The one or more non-transitory, computer-readable media of claim 9, wherein the operations further comprise:

determining, using the first AI model, a first probability that one or more codes may be associated with the clinical information in the record based on the frequency of the one or more medical terms used throughout the record; and determining, using the second AI model, a second probability that one or more codes may be associated with the clinical information in the record based on whether any medical terms are contained in the one or more sections of the clinical information in the record.

11. The one or more non-transitory, computer-readable media of claim 10, wherein the operations further comprise:

generating the first recommendation for performing the coding review based on the first probability; and generating the second recommendation for performing the coding review based on the second probability.

\* \* \* \* \*